United States Patent
Eirich et al.

[11] Patent Number: 5,937,532
[45] Date of Patent: Aug. 17, 1999

[54] RELEASABLE HOOK

[76] Inventors: William S. Eirich, 60689 Bozeman Trail, Bend; Franklin D. Holloway, 2135 Main St., Albany, both of Oreg. 97321

[21] Appl. No.: 08/887,398

[22] Filed: Jul. 2, 1997

[51] Int. Cl.$^6$ .................................................. G01B 3/10
[52] U.S. Cl. ................................ 33/758; 33/413; 33/756
[58] Field of Search ............................... 33/758, 413, 414, 33/755, 756, 757, 759, 760, 768, 770

[56] References Cited

U.S. PATENT DOCUMENTS

| | | |
|---|---|---|
| 338,410 | 3/1886 | Herline, Jr. . |
| 558,113 | 4/1896 | Rodick . |
| 622,856 | 4/1899 | Humphrey . |
| 841,272 | 1/1907 | Read ........................................ 33/758 |
| 917,949 | 4/1909 | Jacky et al. . |
| 1,331,106 | 2/1920 | Hermanson . |
| 1,408,347 | 2/1922 | Currie ...................................... 33/758 |
| 1,542,990 | 6/1925 | Di Tomasso . |
| 1,798,475 | 3/1931 | Langsner . |
| 2,549,287 | 4/1951 | Brennan .................................. 33/758 |
| 2,574,272 | 11/1951 | McCully .................................. 33/770 |
| 3,338,244 | 8/1967 | Burke . |
| 4,819,337 | 4/1989 | Noyes . |
| 4,930,227 | 6/1990 | Ketchpel . |
| 5,215,344 | 6/1993 | Augustyniak . |
| 5,402,583 | 4/1995 | Komura . |
| 5,509,616 | 4/1996 | Millen, Jr. et al. . |

FOREIGN PATENT DOCUMENTS 3842953  7/1990  Germany ................................. 33/755

*Primary Examiner*—Christopher W. Fulton
*Attorney, Agent, or Firm*—Klarquist Sparkman Campbell Leigh & Whinston, LLP

[57] ABSTRACT

A releasable hook for use primarily on the free-end of a line-tool line such as chalk lines, tape measures, and the like. The hook has an engaged position whereby it may be secured to the edge of a, workpiece, and a retracted position whereby it disengages the edge of the workpiece. The hook is biased to its retracted position. Applying tension to the line of the line-tool retains the hook on the edge. However, releasing tension on the line restores the hook to its retracted position, thereby releasing the hook from the edge without the need for the user of the line-tool to be near the hook. In a preferred embodiment, the hook includes a flat base plate and a spring hook member constructed of a strong, but resilient material. The plate and hook member are sized and positioned such that with no forces applied, the opposite end of the hook member is retracted from the base plate. However, pressing the hook member toward the base plate forces the opposite end of the hook member to protrude perpendicularly from the base plate forming a hook that may be placed on the edge of the workpiece. The hook may include a view hole, a nail hole, and a pointed end.

7 Claims, 3 Drawing Sheets

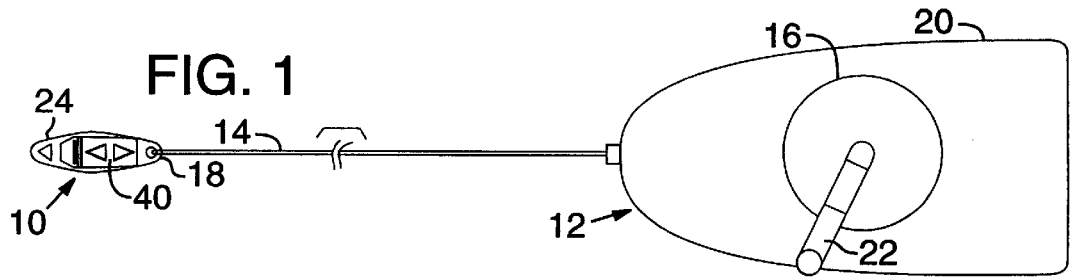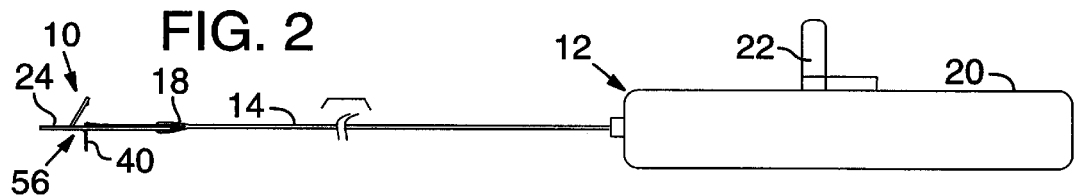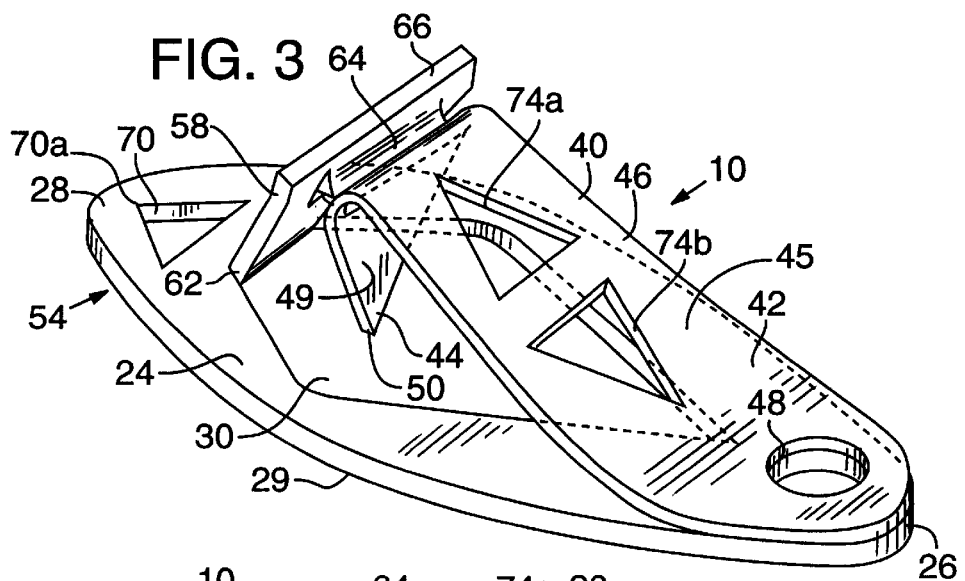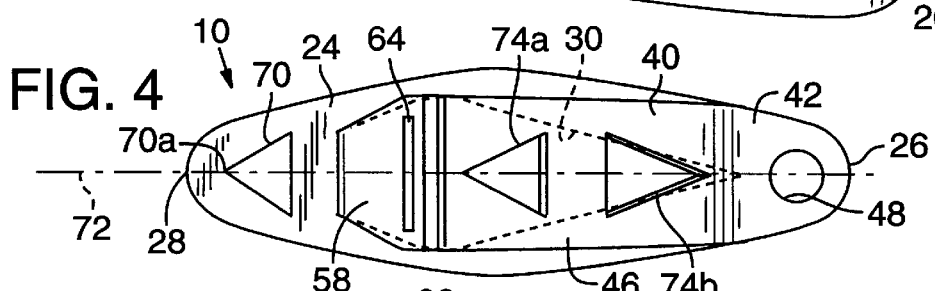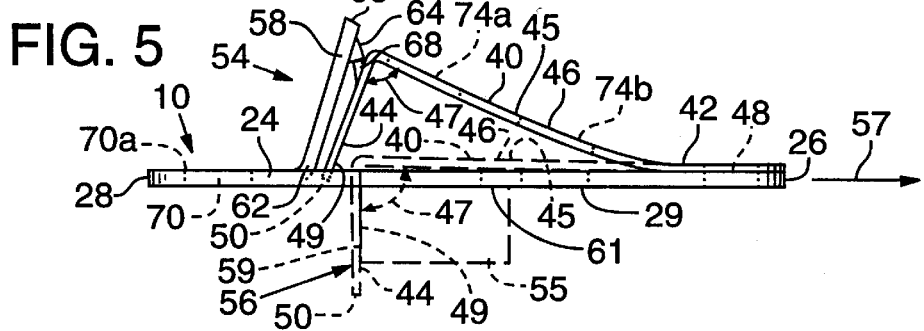

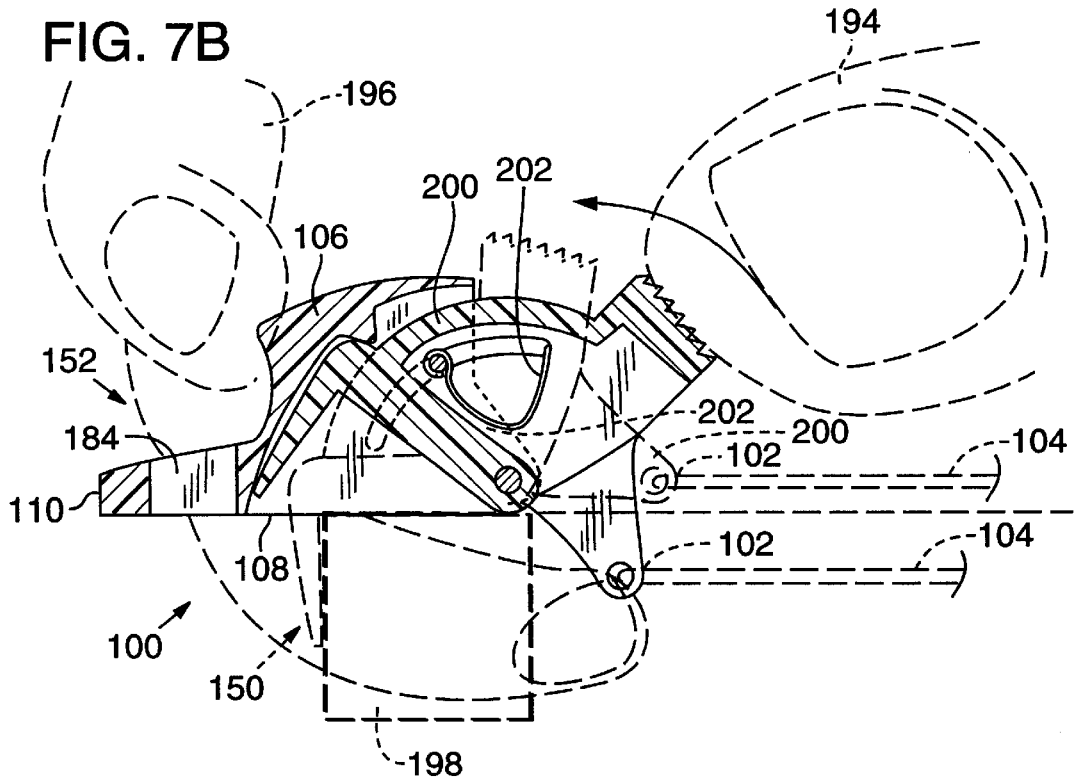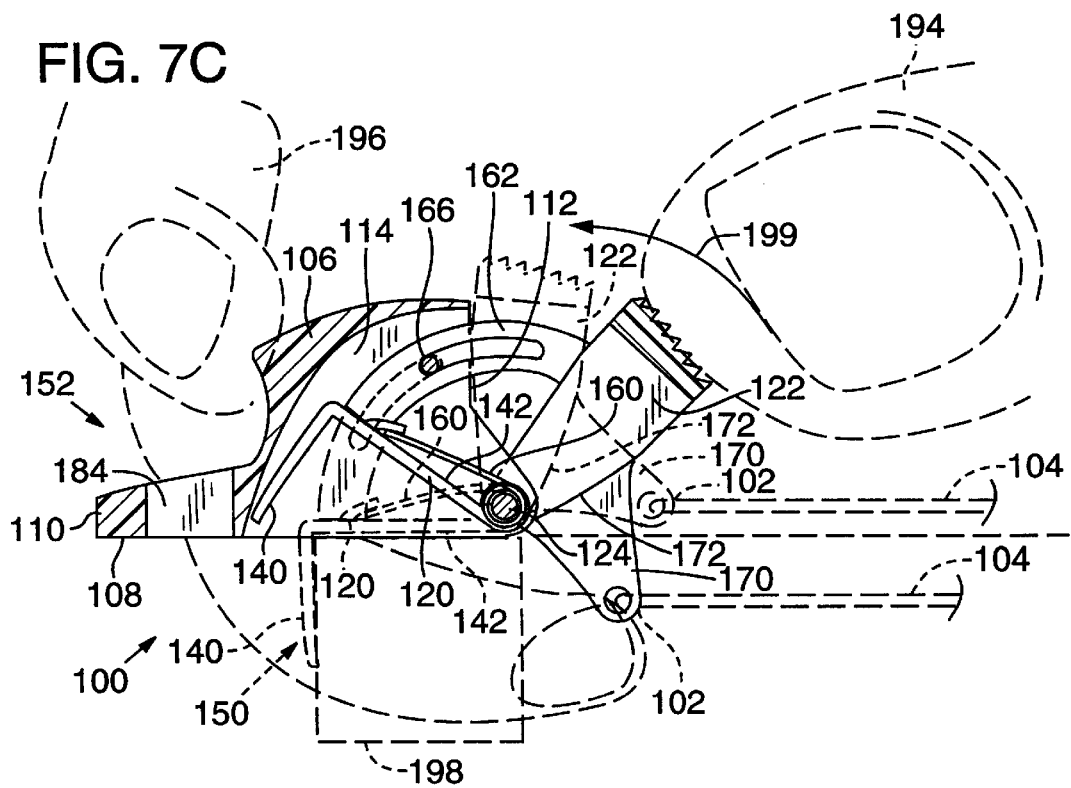

RELEASABLE HOOK

FIELD OF THE INVENTION

The present invention relates to a releasable hook for use primarily at the free-end of line-tools such as chalk-lines, tape measures, and the like.

BACKGROUND OF THE INVENTION

Line-tools including chalk-lines, tape measures, and any other tool having an elongate free-end that is removably secured to an object are widely known and used. For example, chalk-lines are regularly used in construction to mark straight lines. Known chalk-line devices include a length of line with chalk coated thereon or imbedded therein wound on a spool and having a free-end. The spool is usually secured within a housing and includes a handle for winding the line on the spool. The free-end of the line usually has a rigid hook or ring for detachably securing the free-end of the chalk-line to the item to be marked.

In use, the line is unwound from the spool and pulled tight to form a straight line adjacent to a flat surface to be marked. With the ends of the line secured or otherwise held in place, the line is snapped by being pulled in a direction generally perpendicular to the surface and then quickly released. This snapping action makes the line collide with the surface, thereby releasing some of the chalk from the line and marking a straight line on the surface.

Similarly, known tape measure devices are used regularly to measure distances. Known tape measure devices include a length of generally flexible material with units of measurement denoted along its length, wound on a spool and having a free-end. Like chalk-line devices, the spool is usually secured within a housing and may include a handle for winding the flexible material on the spool. The free-end of the line usually has a rigid hook for detachably securing the free-end of the flexible material to the item to be measured.

In use, the flexible material is unwound from the spool and pulled tight to form a straight line adjacent to an area to be measured. The user then reads the units of measurement on the flexible material and adjacent to the desired locations to be measured.

The known means for securing the free-end of line tools involve considerable user time and attention. First, the user can pound a nail into the surface and secure the hook or ring to that nail; second, the user can secure the hook to the edge or lip of the surface; or third, the user can physically hold the free-end in place while attempting to use the line tool.

The first two options present a significant burden to the user who must then exert considerable effort to remove the hook or ring from its secured position. For example, in many construction situations, the hook or ring must be secured at the top of a tall wall with the line or flexible material extending several stories down the wall. After the user snaps the chalk-line or takes the measurement, the user must climb back to the top of the wall to remove the free-end of the line tool from its secured position. Such activity is time consuming and potentially dangerous. Similarly, the third option may not be possible if the user is working alone and is not able to secure the free-end of the line tool to an edge, lip, or nail.

Several inventors have attempted to improve the design of line tool hooks. For example, see U.S. Pat. No. 1,408,347 to Currie and U.S. Pat. No. 4,819,337 to Noyes. However, neither of these references disclose or describe a device that improves on the known means for detaching a secured hook from the object to be marked or measured.

U.S. Pat. No. 1,408,347 to Currie discloses a tapeline holder having a U-shaped member, referred to as a clip, secured to a base positioned at the free-end of a tapeline. The clip may be swung upwardly from the base to prevent its engagement with the surface to be measured, or swung downwardly to permit it to engage and hold and edge or lip of the surface to be marked. The base also includes a barrel with a pin received therein. The pin may be extended or retracted from the barrel, and it may pierce the surface to be measured when extended to secure the free-end of the tapeline to that surface. The pin is spring-biased to its retracted position within the barrel, thereby keeping it out of the way when it is not in use.

The Currie hook device allows either the clip or the pin to secure the free-end of the tape measure to the surface to be measured. However, with the clip swung downwardly and engaging the edge of the surface to be measured, as with the pin piercing the surface, the user must physically retract the clip or pin in order to remove the engaged hook from the surface.

Similarly, the hook device disclosed in U.S. Pat. No. 4,819,337 to Noyes describes a rigid hook secured at the free end of a chalk-line. The hook itself includes a rigid body with a straight center section and perpendicular, oppositely directed end tabs. One tab is positioned over the edge or lip of the surface to be marked. However, the hook may be rotated about a pivot pin to allow the other tab to be secured to the edge or lip of the surface.

As with other known hook devices, the Currie device and Noyes device remain secured to the surface to be marked or measured following the marking or measuring. Accordingly, the user of either device must be able to physically reach the hook in order to release it from the surface being measured. As previously noted, often times it is difficult and time consuming for the user of line-tools, such as tape measures and chalk-line devices, to reach the hook to remove it from the surface to which it is attached.

Accordingly, there remains a need for a line-tool hook that may be easily secured to and released from a surface, even when the user of the tool is not able to physically reach the hook to release it.

SUMMARY OF THE INVENTION

Fulfilling the forgoing need is the primary objective of the invention. More specific objectives of the invention are to provide a releasable hook for use with line-tools that:

(1) may be easily secured to the edge or lip of a surface;
(2) may be easily released from the edge or lip of a surface, even with the user standing at a distance from the hook;
(3) may be detached from the edge or lip of a surface simply by releasing tension on the line of the line-tool;
(4) may be quickly and easily installed on existing known line-tools, such as chalk-lines and tape measures;
(5) continues to allow the hook to be secured by traditional methods such as by being secured to a nail and by piercing the working piece;
(6) may be easily and inexpensively constructed with known materials and construction techniques; and
(7) provides a low cost, easy to maintain, reliable, relatively simple and inexpensive solution to the known problems of line-tool hooks.

The invention is a releasable hook for use primarily with line-tools. The hook has an engaged position whereby it may be secured to the edge or lip of a surface, and a retracted position whereby it disengages the edge or lip of the surface, with the hook biased to its retracted position.

In a preferred embodiment, the hook includes a flat base plate and a spring hook member constructed of a strong, but resilient material. The plate and hook member are secured together at one end with the free-end of the line-tool secured to that end. The plate and hook member are sized and positioned such that with no forces applied, the opposite end of the hook member is retracted from the base plate. However, pressing the hook member toward the base plate forces the opposite end of the hook member to protrude perpendicularly from the base plate forming a hook that may be placed on an edge or lip of a surface. Applying tension to the line of the line-tool retains the hook on the edge. However, releasing tension on the line restores the hook member to its retracted position, thereby releasing the hook from the edge.

The foregoing and other objects, features and advantages of the invention will become more apparent from the following detailed description of preferred embodiments which proceeds with reference to the accompanying drawings.

BRIEF DESCRIPTION OF THE DRAWINGS

FIG. 1 is an enlarged plan view of a chalk-line device having a releasable hook in accordance with a preferred embodiment of the present invention.

FIG. 2 is an enlarged side view of the chalk-line device of FIG. 1 showing the releasable hook in its engaged position.

FIG. 3 is an enlarged perspective view of the releasable hook of FIG. 1 showing the hook in its retracted position.

FIG. 4 is an enlarged plan view of the releasable hook of FIG. 3.

FIG. 5 is an enlarged side view of the releasable hook of FIG. 3 showing the hook in its retracted position and a dashed outline of the hook in its engaged position.

FIG. 7B is an enlarged cross-sectional view of a second alternatively constructed hook of FIG. 6 in its retracted position taken along line 7—7 of FIG. 6 with a dashed outline of the hook in its engaged position and a dashed outline of the thumb and fingers of a hand to show possible handling of the hook during use.

FIG. 7C is an enlarged cross-sectional view of a third alternatively constructed hook of FIG. 6 in its retracted position taken along line 7—7 of FIG. 6 with a dashed outline of the hook in its engaged position and a dashed outline of the thumb and fingers of a hand to show possible handling of the hook during use.

DETAILED DESCRIPTION OF THE PREFERRED EMBODIMENTS

Figure 6:
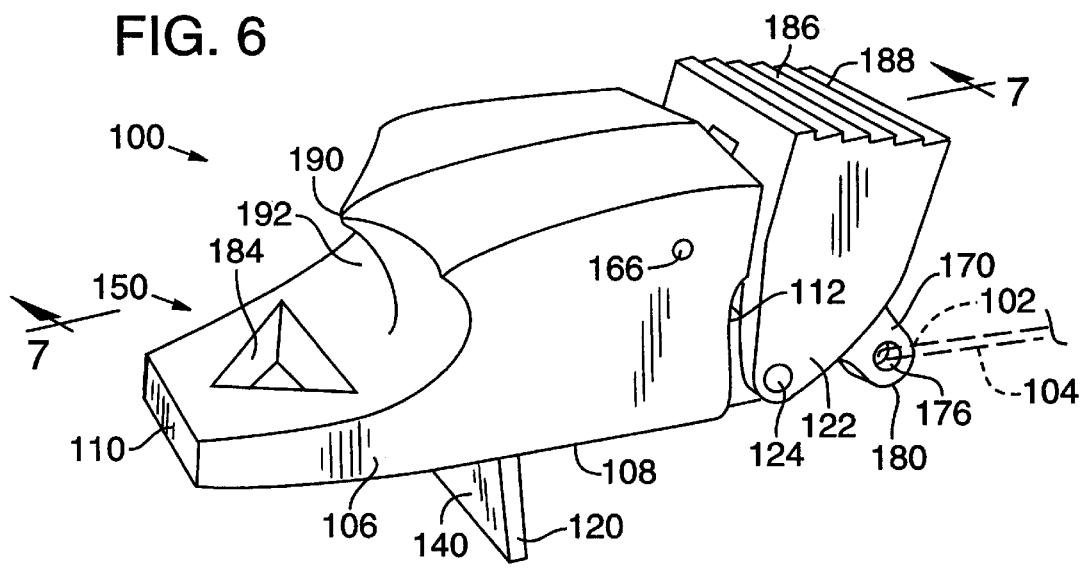
FIG. 6 is an enlarged perspective view of a releasable hook in its engaged position representing an alternative preferred embodiment of the present invention.

A releasable hook 10 for use primarily on line-tools is shown in FIGS. 1–5.

The construction of line-tools, such as a. chalk-line device 12 (FIGS. 1 and 2) and tape measures (not shown), is known. Accordingly, to provide a comprehensive disclosure without unduly lengthening the specification, this specification incorporates by reference the disclosures of U.S. Pat. Nos. 1,408,347 to Currie, 4,819,337 to Noyes, and 5,509,616 to Millen, Jr. et al. These references provide greater detail regarding the general construction of chalk-line devices and tape measures.

In general, the familiar chalk-line device 12 as shown in FIGS. 1 and 2, includes a length of line 14 wound on a spool 16 and having a free-end 18. The spool 16 is secured within a housing 20 and includes a handle 22 for winding the line 14 on the spool 16. The line 14 is Imbedded with or is coated with chalk. Where the line-tool is a tape measure, the line 14 is usually a resilient band of material with units of measurement denoted along its length. The free-end 18 of the line 14 has secured thereto the hook 10 for releasably securing the free-end 18 of the line 14 to an edge or lip of a workpiece, such as a wall or other surface, or a protrusion, such as a nail, extending from the workpiece (hereinafter collectively referred to simply as an edge).

The hook includes a frame member or base and a hook portion or assembly resiliently connected to the frame member or base. In the preferred embodiment shown in FIGS. 1–5, and best shown in FIGS. 3 and 5, the frame member or base of hook 10 includes an elongate flat base plate 24 having a first end 26, a second, or opposite, end 28, a bottom surface 29, and an opening 30 between the first and second ends 26, 28. The hook portion or assembly of hook 10 includes a spring hook member 40 having a base, or first, end section 42, an opposite hook, or second, end section 44, a top surface 45 and a spring section 46 between the base and hook end sections 42, 46. The base plate 24 is constructed of generally rigid material such as metal or plastic, and the hook member 40 is constructed of resilient material, such as spring steel.

The base end section 42 of the hook member 40 and the first end 26 of the base plate 24 are joined flush together by known means, such as by welding. A through hole 48 for securing the hook member 40 to the free-end 18 of the line 14 extends through the area where the hook member 40 and base plate 24 are joined.

The hook end section 44 of the hook member 40 has an inner engaging surface 49 and is preferably generally perpendicular to the spring section 46, but may also have an angle 47 (FIG. 5) less than 90 degrees, and is sized and shaped to fit through the opening 30 in the base plate 24. Preferably, the hook end section 44 is of a triangular shape forming a tip 50 at its outer end. The spring section 46 is bent upwardly as shown relative to the base end section 42 such that when no force is acting on the hook member 40, the tip 50 of the hook end section 44 does not protrude through the opening 30 in the base plate 24. This configuration defines the retracted position 54 for the hook 10 shown in solid outline in FIGS. 3 and 5.

As best shown in dashed outline in FIG. 5, the hook end section 44 of hook member 40 may extend through the opening 30 substantially perpendicular to the base plate 24 to form a hook for engaging a workpiece, shown in dashed outline at 55 (FIG. 5). This defines the engaged position 56 of the hook 10. More specifically, the workpiece 55 (FIG. 5) has an edge surface 59 and a tool surface 61. With the hook 10 in the engaged position 56, the bottom surface 29 of the base plate 24 may be positioned adjacent to the tool surface 61 of the workpiece 55 while the inner engaging surface 49 of the hook end section is positioned adjacent to the edge surface 59 of the workpiece 55.

In light of the shape and resiliency of the hook member 40, the hook member 40 is biased to the retracted position 54. Constant force in the direction of arrow 57 (FIG. 5) must be exerted on the hook member 40 to engage and produce sufficient frictional force between the hook and workpiece to keep the hook member 40 engaged on a workpiece 55.

Preferably, a generally rigid alignment plate 58, secured at one end 62 to the base plate 24, extends parallel to and adjacent the hook end section 44 of the hook member 40 when the hook 10 is in its retracted position 54. When the hook 10 is in its retracted position 54, a raised catch 64 positioned toward the opposite end 66 of the alignment plate 58 interacts with a correspondingly positioned catch 68 on the hook end section 44 of the hook member 40 to prevent the hook member 40 from becoming misaligned relative to the base plate 24 and ensures that hook 10 maintains a consistent retracted position 54.

In order to facilitate easy securing of the hook 10 to a nail (not shown) for some uses, it is preferable for the base plate 24 to include a triangular-shaped nail hole 70 near its second end 28. One angled interior corner 70a of the triangular shaped hole 70 should be aligned with the longitudinal center line 72 of the hook 10 to facilitate easy alignment and positioning of the hook 10 on the nail (not shown).

Similarly, it is desirable to include view holes 74a, 74b, preferably at least two, in the spring section 46 of the hook member 40. These view holes 74a, 74b facilitate positioning and use of the hook 10.

Having fully described the releasable hook 10, its use will be described. The user of a line-tool 12 having the hook 10 installed at the free-end 18 of the line 14 may easily secure the hook 10 to an edge, such as found on a workpiece 55 (FIG. 5), simply by pressing the spring section 46 of the hook member 40 toward the base plate 24. This action extends the hook end section 44 of the hook member 40 so that it projects from the bottom surface 29 of base plate 24 and places the hook 10 in its engaged position 56 (FIGS. 2 and 5).

Referring now to FIG. 5, using view holes 74a, 74b, the user then positions the hook end section 44 on the edge, such as found on a workpiece 55 (FIG. 5), so that the inner engaging surface 49 of the hook end section 46 is positioned adjacent to the edge surface 59 of the workpiece 55 and the bottom surface 29 of the base plate 24 is positioned adjacent to the tool surface 61 of the workpiece 55, and applies tension to the line 14 in the direction of arrow 57 to keep the hook end section 44 engaged on the edge.

After the user is finished using the line-tool, he simply releases tension on the line 14. This action allows the hook member 40 to be returned by spring section 46 to assume its biased retracted position 54 (FIGS. 3 and 5), thereby releasing the hook 10 from the edge, such as found on workpiece 55 (FIG. 5). Unlike traditional hooks on line-tools, such release may be accomplished without the user needing to be positioned near the hook 10. Similarly, because of the simple design and construction of the hook 10, it may be readily installed on any known line-tool device.

The hook also may be used in a traditional manner and be secured directly to a nail (not shown) or may be imbedded directly into the workpiece. In such case, the user simply secures the hook 10 to a nail (not shown) in the workpiece using the nail hole 70 received near the second end 28 of the base plate 24. Alternatively, the triangular shaped hook end section 44 of the hook member 40 may pierce the workpiece and thereby secure the hook 10 to the workpiece.

Figure 7A:
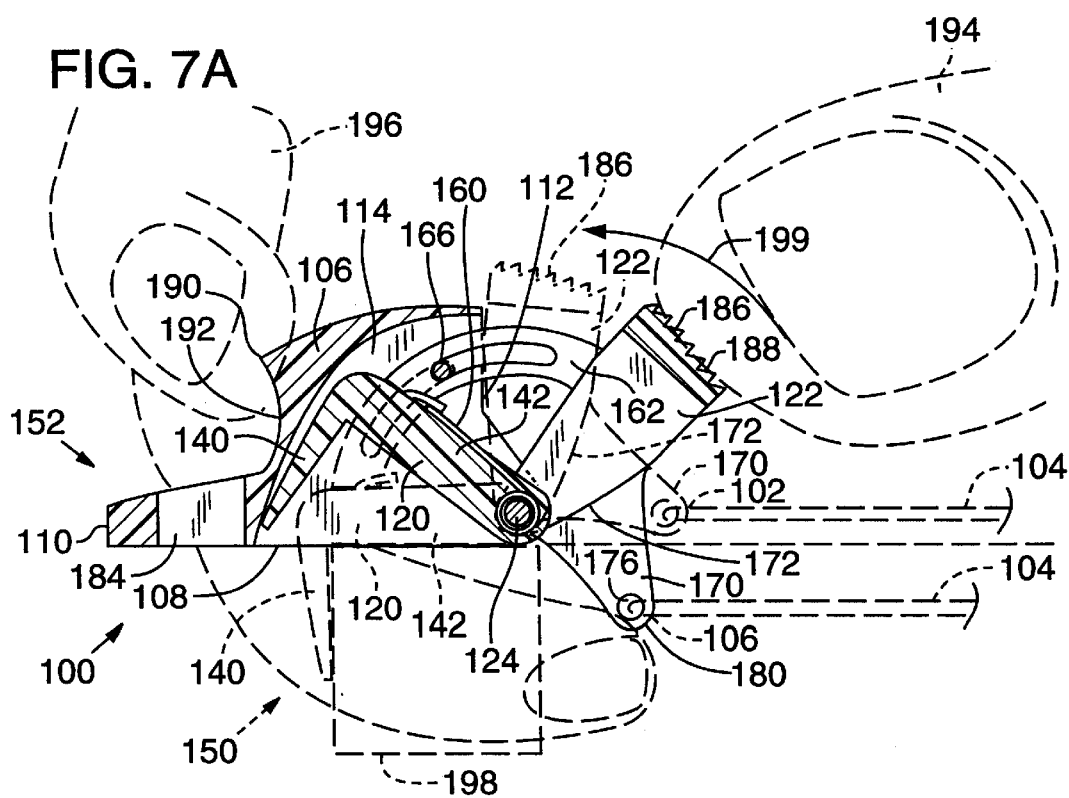
FIG. 7A is an enlarged cross-sectional view of the hook of FIG. 6 in its retracted position taken along line 7—7 of FIG. 6 with a dashed outline of the hook in its engaged position and a dashed outline of the thumb and fingers of a hand to show possible handling of the hook during use.

Referring now to FIGS. 6 and 7A, an alternative embodiment of the releasable hook 190 for use on the free-end 102 of a line 104 for a line-tool is shown. In this alternative preferred embodiment, the frame member or base of hook 100 includes a base housing 106, a pivoting actuating member 122, and a pivot pin 124. The base housing 106 has a flat bottom surface 108, a front end 110, a rear end 112, and an opening 114 for retractably receiving a releasable L-shaped hook member 120 through opening 114 in the bottom surface 108. The pivoting actuating member 122 is pivotally secured to the base housing 106 through a pivot pin 124 positioned near the rear end 112 and bottom surface 108 of the base housing 106. The base housing 106, hook member 120, and pivoting actuating member 122 are constructed of generally rigid durable material such as plastic or metal.

The hook portion or assembly of hook 100 includes the L-shaped hook member 120 having a hook end section 140 and a base end 142. The hook member 120 is pivotally secured to the pivot pin 124 at its base end 142. The hook member 120 pivots about the pin 124 such that the hook end section 140 may extend generally perpendicular to the bottom surface 108 and through the opening 114 in the base housing 106. This position defines the engaged position of the hook 150 (shown in solid line in FIG. 6 and dashed outline in FIG. 7A).

Similarly, the hook member 120 may pivot about the pin 124 such that the hook end section 140 may be retracted within the base housing 106. This position defines the retracted position of the hook 152 (FIG. 7A). A resilient member, such as a coil spring 160, operably connected to pivot pin 124 and hook member 120 as shown in FIG. 7A, urges the hook member 120 to its retracted position 152.

The pivoting actuating member 122 includes a line retaining arm 170, positioned generally perpendicular from the pivoting actuating member 122 and secured at one end 172 to the pivoting actuating member 122 is secured to the line 104 through a hole 176 received in its opposite end 180. The line retaining arm 170 is sized and positioned such that its serves as a lever arm for pivoting the pivoting actuating member 122 about the pivot pin 124. The pivoting actuating member 122 is sized and shaped to pivot about the pivot pin 124 at the rear end 112 of the base housing 106. The extending portions of the actuating member 122 and retaining arm 170 are positioned above the bottom surface 108 of the base housing 106 when the hook 100 is in its engaged position 150.

An engaging arm 162, secured to the pivoting actuating member 122 and slidably secured to the base housing 106 through a pin 166, extends to the hook member 120 such that positioning the pivoting actuating member 122 adjacent to the base housing 106 forces the hook member 120 to its engaged position 150 (FIGS. 6 and 7A).

Preferably, the base housing 106 includes a triangular shaped nail hole 184 toward its front end 110 for traditional securing the hook 100 to a nail (not shown). Also, it is desirable for the upper outer surface 186 of the pivoting actuating member 122 to include ridges 188 and the upper outer front surface 190 of the base housing 106 to have an appropriately shaped recess 192 to permit the hook 100 to be easily grasped and placed in the engaged position 150 simply by positioning these surfaces 186, 190 between the user's thumb 194 and forefinger 196 as shown in FIG. 7A.

Having fully described this alternative preferred embodiment of the releasable hook 100, its use should be quite apparent. The user of a line-tool having the alternative preferred hook 100 installed at the free-end 102 of the line 104 may easily secure the hook 100 to an edge, such as found on a workpiece 198 (FIG. 7A) simply by grasping the hook 100 between their thumb 194 and forefinger 196 as shown in FIG. 7A and pivoting the pivoting actuating member 122 about the pivot pin 124 toward the rear end 112 of the base housing 106 in the direction of the arrow 199. This action extends the hook end section 140 of the hook member 120 and places the hook 100 in its engaged position 150 (FIGS. 6 and 7A). Alternatively, while grasping the base housing 106, the user can simply pull on the line 104. This action will also urge the pivoting actuating member 122 toward the base housing 106 and cause the hook member 120 to extend thereby placing the hook 100 in its engaged position 150 (FIGS. 6 and 7A). The user then positions the hook end section 140 on the edge, such as found on workpiece 198 (FIG. 7A) and applies tension to the line 104 to keep the hook end section 140 engaged on the edge.

After the user is finished using the line-tool, he simply releases tension on the line 104. This action allows the hook member 120 to assume its biased retracted position 152 (FIG. 7A), thereby releasing the hook 100 from the edge, such as found on workpiece 198 (FIG. 7A). As with the previous embodiment, such release may be accomplished without the user positioned near the hook 100.

The alternative preferred hook 100 may also be used in a traditional manner such as being secured directly to a nail (not shown). In such case, the user simply secures the hook 100 to a nail extending from a workpiece using the nail hole 184 received near the front end 110 of the base housing 106. Also, the hook end section 140 of the hook member 120 could be triangular-shaped (not shown) coming to a tip (not shown) at its end. In such case, the tip (not shown) could pierce the workpiece (not shown) and thereby secure the hook 100 in place.

Having described and illustrated the principles of the invention with reference to preferred embodiments thereof, it will be apparent that these embodiments can be modified in arrangement and detail without departing from the principles of the invention. For example, as shown in FIG. 7B, the hook member 120, engaging arm 162, pivoting actuating member 122, and line retaining arm 170 may all be a single sliding unit 200, such as molded plastic. In such case, the resilient member that urges the hock 100 to its retracted position 152 may be a line spring 202 operably secured between the pin 166 and the sliding unit 200. Similarly, as shown in FIG. 7C, the hook member 120 may be constructed with any generally rigid material including a piece of bent metal.

Also, the hook of the first preferred embodiment (FIGS. 1–5) may also be used in an inverted orientation (not shown). In this orientation, the alignment plate 58 is removed so that the top surface 45 (FIGS. 3 and 5) of the hook member 40 rests directly on the tool surface 61 (FIG. 5) of the workpiece 55 (FIG. 5). The base plate 24 is thereby positioned above the hook member 40, and the second end 28 of the base plate 24 may lower and raise from the surface 59 when the hook is placed in its engaged position 56 and retracted position 54, respectively. A fastening rod (not shown), such as a nail, is secured generally perpendicular to the surface 59 and extends from the surface 59 by a length no longer than the length of the hook end section 44 of the hook member 40. The hook 10 is installed on the fastening rod (not shown) by placing the hook in its engaged position (FIG. 2 and shown in dashed outline in FIG. 5) and inverting the hook as described. The hook is then secured to the all fastening rod by placing the rod through the triangular shaped nail hole 70.

In this configuration, constant force in the direction of arrow 57 (FIG. 5), such as by applying constant tension to the line, must be exerted on the hook 40 to engage and keep the base plate secured to the fastening rod. Releasing tension of the line causes the hook member 40 to assume its retracted position 54, lifting the second end 28 of base plate 24 above the fastening rod, and thereby releasing the hook from the fastening rod.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

What is claimed:

1. A hook for detachably securing a free end of a line to an edge of a workpiece comprising:

a frame member secured to the free end of the line;

a hook assembly including a hook member having a base end portion constructed of resilient material and being rigidly secured to the frame member at the base end portion, with the free end of the line secured to the base end portion of the hook member and the frame, said hook member sized and shaped to engage the edge, said hook assembly having an engaged position wherein the hook member may be positioned relative to the frame to engage the edge, and a retracted position wherein said hook member may be positioned relative to the frame so as to not engage the edge, said hook assembly biased to the retracted position, said resilient material allowing the hook end portion of the hook member to move between the retracted position and engaged position, said hook assembly being sized and shaped to retain its engaged position on the edge of the workpiece when tension is applied to the line with said hook assembly assuming its retracted position when the tension is removed from the line, thereby releasing the hook from the edge of the workpiece.

2. The hook of claim 1, wherein said frame member includes at least one nail hole.

3. The hook of claim 1, wherein said hook member has a pointed end for piercing a surface.

4. The hook of claim 1 for use with a chalk line device, wherein the line is a chalk line.

5. The hook of claim 1 for use with a tape measure device, wherein the line is a tape measure.

6. The hook of claim 1, wherein said hook member is L-shaped.

7. The hook of claim 1, further including a view hole.

* * * * *